Aug. 11, 1959     J. A. LATZKO     2,899,254
SHEET METAL SWITCH PANEL ENCLOSURE
Filed Dec. 30, 1955
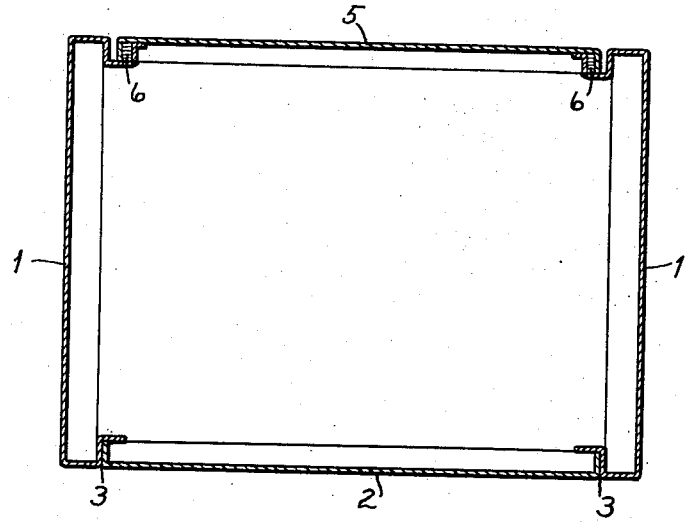
*Fig. 1.*
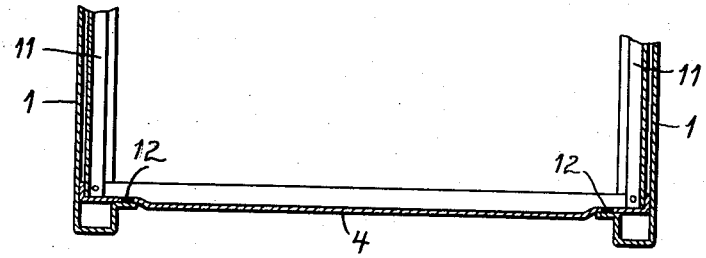
*Fig. 2.*
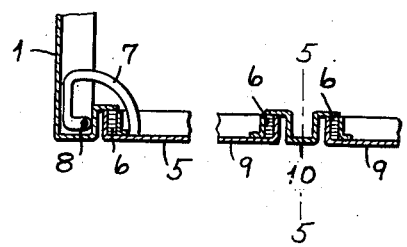 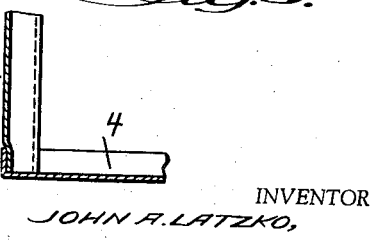
*Fig. 3.*    *Fig. 4.*    *Fig. 5.*
INVENTOR
JOHN A. LATZKO,
BY *Pierce, Scheffler & Parker*
ATTORNEYS

United States Patent Office 2,899,254
Patented Aug. 11, 1959

2,899,254

SHEET METAL SWITCH PANEL ENCLOSURE

John Alexander Latzko, Baden, Switzerland, assignor to Aktiengesellschaft Brown, Boveri & Cie., Baden, Switzerland Application December 30, 1955, Serial No. 556,740

Claims priority, application Australia January 5, 1955

3 Claims. (Cl. 312—257)

Power switch gear for high and low voltages is now frequently installed in fully enclosed switchboards made of sheet and, if necessary, sub-divided into separate compartments, or it is installed in partially open switch panel enclosures. Both types of construction will be referred to below by the term sheet metal switch panel enclosures.

Such switch panel enclosures vary in shape and size as well as in basic construction due to their numerous purposes. If, for instance, the gear to be installed is heavy, such as high voltage power switches, welded sectional steel constructions are employed, their outside covered by sheet metal, a rather high cost construction method. In installations of smaller size, suitable shaped sheet metal, specially manufactured to meet individual specifications, has been substituted for the section iron. Complicated structures are necessary to attain flush front pieces. Such designs are also inconvenient when operating conditions require modifications to be made within the switch panel enclosure. In most cases it will be necessary to construct new enclosures, leading to time and money consuming changes and causing interruptions of longer duration.

The invention proposes an arrangement, employing the construction box principle, by which various panel enclosure types and sizes can be assembled by use of comparatively few basic parts, the individual components being shaped in such manner that they will always form a flush surface. The arrangement of the invention also facilitates modifications of assembled installations because the individual components, whenever possible, are fastened to each other in such manner that their disassembly will be comparatively easy. This means connections which are bolted, riveted or rivet-welded. Such connections can be severed without damage to the sheet metals connected in this manner. The term rivet-welded means a procedure by which two pieces of sheet metal are connected in such manner that a welding substance is inserted into round holes of one of the sheet metals and then welded to the other sheet, an operation similar to riveting. Such connections can be severed by use of a chisel without damage to the sheet metal.

Said advantages are attained under the invention in such manner that the frame construction and the cover of the switch panel enclosures are combined and are composed of only three basic constructional parts by employment of the construction box principle. The first component is a flat, non-bent metal plate, the second is bent into a trough shape and the third is a profiled—for instance angularly bent—sheet metal. The flanges of the bent sheet metal serve simultaneously as connecting links for the sheets, as vertical and horizontal braces for the panel, as frames for the vertical and horizontal subdivision of a panel into compartments, and as supports for the gear to be installed. Said sheet metal constructional plate components are offset along their border portions, where necessary, by an amount equivalent to the thickness of the sheet metal in order that the offset sections will hook behind other constructional plates, but fit flush otherwise.

The foregoing and other objects and advantages inherent in the invention will become more apparent from the following detailed description of a preferred embodiment and from the accompanying drawings in which:

Fig. 1 is a horizontal section through the switch panel enclosure;

Fig. 2 is a vertical section of the lower portion of the enclosure;

Fig. 3 is a fragmentary horizontal section through a corner of an enclosure showing a hinge arrangement for a door component;

Fig. 4 is a fragmentary horizontal section showing a double door arrangement for an enclosure permitting the enclosure to be divided vertically into two compartments; and Fig. 5 is a fragmentary vertical section on line 5—5 of Fig. 4.

With reference now to the drawings and in particular to Fig. 1 it will be observed that the switch panel enclosure is comprised of a fixed front plate 2 and a door-like cover plate 5. The side plates 1 are trough shaped and, in the illustrated embodiment are bent on all sides twice in flange fashion. It is also possible to design constructions wherein the side plates are bent only once, either on one side or on both sides. The fixed front plate 2 is connected with the troughs of the side plate 1 at points 3. The connections can be accomplished by bolting, riveting or rivet-welding. A peripheral door seal is indicated at 6.

Figure 2 shows the lower portion of the enclosure. Numerals 1 again indicate the side plates which are closed off at the bottom ends by the profiled bottom sheet metal plate 4; in the example shown this is angularly bent. Said sheet metal plate 4 is offset corresponding to the thickness of the sheet, permitting a flush fit. An identical offset is provided at the upper part of the enclosure. An unbroken frame for doors in front and back is thereby formed in a simple manner. Two additional angle bars 11, one leg of which is also offset, can be placed at the side troughs 1 and be connected to the angularly bent plate 4 in such manner that an all-over flush frame is formed, to which a flat plate can be bolted to subdivide the panel horizontally. The entire panel enclosure is therefore assembled by means of three above described constructional components. The flange-shaped bends act at the same time as braces for the entire enclosure.

Figure 3 shows the installation of a hinged door. Only one corner of the switch panel enclosure is shown. Numeral 1 again indicates the side plate to which the door 5 is fastened by the hinge 7, the latter turning about pin 8. Numeral 6 indicates the sealing for the door. Due to the arrangement devised, said sealing will lift without friction upon the opening of the door 5 because there is no tangential movement at the sealing area.

Frequently only parts of a panel enclosure in fully enclosed installations need to be devised in such manner that they can be opened easily at all times, while other parts of the panel enclosure can be closed off permanently or by bolted doors. It is a further advantage of the invention that the various types of plates can be used one above the other in one panel enclosure with the enclosure still retaining a flush front and back.

If such method of subdivision is desired, it is possible to mount additional, angularly bent, sheet metal plates at the points to be subdivided, similar to the manner shown in Figure 2, and subdividing sheet metal plates can be fastened to said sheet metal plates which will simultaneously serve as stops for those plates which cover only parts of the enclosure.

In order to be able to manufacture the trough-shaped side plates 1 in standard sizes regardless of any subdivision of a panel into compartments, said plates are provided with holes in a vertical row along their front and back edges, a device which will allow selection of holes for fastening the profiled sheet metal plate 4 at the height desired, and which will make it possible also to connect the constructional components to each other. A rivet-welding operation at points 12 will hold the sheet metal 4 in position while the component parts of the panel are being bolted, and will at the same time serve to make the corners of the trough-shaped side plates into a rigid support.

Another advantage of the rows of holes is the possibility to modify with ease any subdivided compartment in case of subsequent installation changes.

Frequently it is also necessary to subdivide the panels vertically. This can also be accomplished easily if, as is shown in the outline of Figure 4, another intermediate, trough-shaped, sheet metal 10 is provided in the middle of the panel with the flange of said sheet metal serving as door stop. This sheet metal is incorporated in the basic framework of the panel and made to fit flush by means of an offset arrangement. Numerals 9 indicate the two doors which close off this compartment, the doors being held by the trough-shaped intermediate sheet metal 10. The offset arrangement of said plate is illustrated by Figure 5, which shows a side view, by showing the connection of said plate 10 with the angular shaped sheet metal plate 4, which forms the lower part of the door frame. The sheet metal 10 is offset in such manner that it will form a flush surface. An identical arrangement is made at the upper end. In case of horizontal subdivision, congruous situations will arise at other points of the panel.

I claim:

1. A sheet metal panel enclosure for high and low voltage installations, the walls of said enclosure consisting only of a pair of parallel spaced rectangular trough-like side plates of sheet metal having all four edge portions thereof bent to establish a peripheral channel, the edge portions terminating in an inwardly turned flange extending perpendicular to the plane of the corresponding sheet metal plate, top and bottom non-channeled plates of sheet metal secured to the inner faces of said inwardly turned flanges at the top and bottom of said side plates, the edge portions of said top and bottom plates being offset transversely inwardly to establish a flush outer surface between said plates and said flanges, and front and rear sheet metal closure plates extending between and secured to the channel portions along the sides of said side plates.

2. A sheet metal panel enclosure as defined in claim 1 wherein said front and rear sheet metal closure plates are provided with inturned flanges engaging said channel portions.

3. A sheet metal panel enclosure as defined in claim 2 wherein one of said closure plates is hinged to the channeled portion of one of said side plates.

References Cited in the file of this patent

UNITED STATES PATENTS

| | | |
|---|---|---|
| 1,013,535 | Crawford | Jan. 2, 1912 |
| 1,319,603 | Monfet | Oct. 21, 1919 |
| 1,990,756 | Saaf | Feb. 12, 1935 |
| 2,205,826 | Small | June 25, 1940 |
| 2,424,217 | Boles | July 22, 1947 |
| 2,443,515 | Rockwell | June 15, 1948 |
| 2,591,172 | Lundine | Apr. 1, 1952 |
| 2,749,199 | O'Connor | June 5, 1956 |